(12) United States Patent
Murota et al.

(10) Patent No.: US 6,677,095 B2
(45) Date of Patent: Jan. 13, 2004

(54) FINE METAL OXIDE POWDER HAVING HIGH DISPERSIBILITY AND TONER COMPOSITION COMPRISING THE SAME

(75) Inventors: Masamichi Murota, Mie (JP); Toshio Morii, Mie (JP); Hirokuni Shirono, Mie (JP)

(73) Assignee: Nippon Aerosil Co., Ltd., Tokyo (JP)

( * ) Notice: Subject to any disclaimer, the term of this patent is extended or adjusted under 35 U.S.C. 154(b) by 0 days.

(21) Appl. No.: 10/148,212

(22) PCT Filed: Dec. 8, 2000

(86) PCT No.: PCT/JP00/08720
§ 371 (c)(1),
(2), (4) Date: Sep. 5, 2002

(87) PCT Pub. No.: WO01/42372
PCT Pub. Date: Jun. 14, 2001

(65) Prior Publication Data
US 2003/0077533 A1 Apr. 24, 2003

(30) Foreign Application Priority Data
Dec. 8, 1999 (JP) .......................................... 11-348351

(51) Int. Cl.⁷ ................................................. G03G 9/113
(52) U.S. Cl. ............................... 430/108.3; 430/108.6; 430/108.7; 428/402; 428/405
(58) Field of Search ........................... 430/108.3, 108.6, 430/108.7; 428/402, 405

(56) References Cited

U.S. PATENT DOCUMENTS

| | | | |
|---|---|---|---|
| 4,623,605 A | | 11/1986 | Kato et al. |
| 5,843,525 A | * | 12/1998 | Shibasaki et al. ............ 427/214 |
| 6,077,640 A | | 6/2000 | Komai et al. |
| 6,224,980 B1 | | 5/2001 | Komai et al. |
| 2002/0004026 A1 | | 1/2002 | Ishibashi et al. |

FOREIGN PATENT DOCUMENTS

| | | |
|---|---|---|
| EP | 949302 | 10/1999 |
| EP | 1 188 714 | 3/2002 |
| JP | 2-89064 | 3/1990 |
| JP | 4-280255 | 10/1992 |
| JP | 6-202373 | 7/1994 |
| JP | 8-69181 | 3/1996 |
| JP | 9-302273 | 11/1997 |

* cited by examiner

Primary Examiner—John Goodrow
(74) Attorney, Agent, or Firm—Oblon, Spivak, McClelland, Maier & Neustadt, P.C.

(57) ABSTRACT

Regarding the metal oxide fine powder, which is used as the additive of a powder material and is hydrophobic treated on the surface, the peak of the particle size distribution of the agglomerated particle is made to be less than the same level of average size of the powder material, so that said powder has high dispersibility in the powder material. When this metal oxide fine powder is used as the external additive, such as the toner for the electronic photograph, the standup of the electrostatic charge, the image quality, and the cleaning characteristic are improved remarkably.

18 Claims, No Drawings

FINE METAL OXIDE POWDER HAVING HIGH DISPERSIBILITY AND TONER COMPOSITION COMPRISING THE SAME

TECHNICAL FIELD OF THE INVENTION

The present invention relates to a high dispersible metal oxide fine powder added in a powder material, such as a coating powder, a toner for an electronic photograph, etc., for the purpose, such as flowability improve, caking prevention, and electrostatic charge control of a powder, and its composite. Specifically, the present invention relates to a high dispersible metal oxide fine powder, which can remarkably improve standup of the electrostatic charge, a image quality, and a cleaning characteristic, by containing said metal oxide fine powder, and to a toner composite containing said powder. In addition, the toner composite of the present invention contains the powder, which is used for not only the electronic photograph but also various electrostatic pictures, such as an electrostatic recording, an electrostatic printing, etc.

BACKGROUND OF THE INVENTION

A developer of the electronic photograph, etc., has comprised the toner composite, in which some external additives are added to the toner, and contained a carrier, for example, a glass bead, an iron powder, or an ferrite carrier, etc., if necessary. As the toner of the external additive, the fine powders are used, which are surface-treated on the metal oxide fine powder, such as fine silica, titania, or alumina, etc., with an organic material, and the flowability and the electrostatic charge of the toner are controlled by this external additive. Especially, the average particle size of the toner has been made fine from about 10 μm to 5 μm recently because of the demand of high imaging quality of the electronic photograph. However, there is a problem with this making fine powder, in which the flowability of the toner is decreased, so that is a tendency that the amount of the external additive is increased to improve the flowability of the toner. Moreover, a characteristic of the external additive has been much influenced on the electrostatic charge of the toner by increasing said amount of the additive. For example, if the additive is distributed irregularly in the toner, a high quality development characteristic can not be obtained. For this reason, the additive having good dispersibility is required.

Conventionally, as the external additives of the toner for the electronic photograph, the metal oxide fine powder treated with hydrophobic treatment is used. When the amount of the treatment reagent used is increased to stabilize the surface treatment, it becomes agglomerated the particle, so that the flowability and the dispersibility are decreased on the contrary. Therefore, the process of pulverizing the surface-treated metal oxide powder is proposed. For example, in Japanese Patent Raid Open Hei 2-42452, or Hei 8-152742, the pulverizing to use the surface-treated metal oxide fine powder by a jet mill is shown. However, this pulverizing by the jet mill has high energy cost and, moreover, the particle size after pulverizing is very fine, so that there are problems in dust and handling.

DISCLOSURE OF THE INVENTION

The present invention solves the conventional above-mentioned problems about the metal oxide fine powder used as the external additive of the powder material, such as the toner, etc., and provides the metal oxide fine powder, which has low pulverizing cost, good dispersibility at the time of adding to the powder material, by using the metal oxide fine powder controlled the distribution of the agglomerated particle size according to the average particle size of the powder material, such as the toner etc. Moreover, the present invention also provides the toner composite having the stable electrostatic charge and the good flowability, by containing this metal oxide fine powder.

That is, the present invention relates to the metal oxide fine powder used as the external additive of the powder material, wherein the surface of said powder is hydrophobic treated and has high dispersibility in the powder material by which the peak of the size distribution of the agglomerated particles makes lower than the level of the average particle size of the powder material. Regarding the metal oxide fine powder of the present invention, for example, it is preferable that the average first particle size is less than 300 nm (nano meter), its agglomerated particle has the peak of the particle size distribution in the range of less than 10 μm (micron meter) preferably 5 μm, the specific surface area by the BET method is 10–400 $m^2/g$, the hydrophobicity is more than 30%, and the bulk density is more than 30 g/L, preferably more than 100 g/L. Moreover, the composition of the metal oxide fine powder is, for example, silica, titania, alumina, zirconia, or these composite oxides, which are hydrophobic treated on the surface with organic silicon compounds. Moreover, the powder material added the metal oxide fine powder of the present invention is, for example, the toner for the powder coating or the electronic photograph. Furthermore, the present invention also relates to the toner composite, which has high flowability by addition with such metal oxide fine powder. It is preferable that the content of the metal oxide fine powder in this toner composite is 0.01–5.0% by weight.

[I] Metal Oxide Fine Powder

The metal oxide fine powder of the present invention is the fine powder, which is silica, titania, alumina, zirconia, a composite oxide of more than two kinds of these metals, or a mixed oxide of more than two kinds of metal oxides. In addition, in the present invention, silica is also included in the metal oxide. The metal oxide fine powder of the present invention is obtained by the surface-treatment with the organic silicon compound, etc., and pulverizing. Furthermore, it is available that the surface treatment and the pulverizing are done simultaneously, before or after.

[II] Surface Treatment

The above-mentioned metal oxide fine powder is hydrophobic treated with the surface treatment reagents, such as the organic silicon compounds. As these surface treatment reagent s, for example, a silicone oil or a silane coupling reagent, such as trimethylchlorosilane, dimethyldichlorosilane, methyltrichlorosilane, trimethylalkoxisilane, dimethylalkoxisilane, methyltrialkoxysilane, and hexamethyldisilazane, etc., an organopolysiloxane or some modified silicone oil including an organopolysiloxane are used. The kind of these silane coupling reagents is not limited, and various kinds of alkoxysilane, chlorosilane, or silazane can be used. Moreover, the kind of the organopolysiloxane is not also limited, so that a dimethyl silicone oil, a methylhydrogene silicone oil, a phenyl silicone oil, a non-reactive silicone oil, or a reactive silicone oil, can be used.

The process and conditions of the surface treatment are not limited. It is available that the conventional surface treatment process is done. For example, an uniform surface modified metal oxide fine powder is obtained by the followings. At first, predetermined amount of the silane coupling agent or the organopolysiloxane is dropped or sprayed onto the metal oxide powder to be dispersed fully with a solvent if necessary. The dispersed powder is stirred at more than 50° C., preferably more than 100° C., more preferably 100° C.–400° C. for 0.1–5 hours, preferably 1–2 hours, and then is cooled.

[III] Hydrophobicity

Regarding the surface treated metal oxide fine powder, it is preferably that the degree of hydrophobicity measured by a transparency method is more than 30%. If the hydrophobicity is less than 30%, the improvement of the moisture resistance or the electrostatic charge stability of the toner is not sufficient when it is used as the external additive of the toner. It is more preferably that the hydrophobicity is more than 60%.

[IV] Particle Size Range

The surface modified metal oxide fine powder of the present invention is used as the external additive of the powder material, wherein the peak of the particle size distribution of the agglomerated particle (the secondary particle) is less than the same level of the average particle size of the above-mentioned powder material. It is preferably that said metal oxide fine powder has less than 300 nm (nano meter) of the average primary particle size, 10–400 $m^2/g$ of the specific surface area by the BET method and the agglomerated particle has the peak of the particle size distribution at the range less than 10 $\mu$m (micro meter) preferably less than 5 $\mu$m. In this case, the meaning of the powder material is the powder added the metal oxide particle of the present invention, such as the toner for the electronic photograph etc. The meaning of less than the same level of the average particle size of the powder material is same or less than the average particle size of the powder material. Moreover, the meaning of having the peak of the particle size distribution is that having the maximum value in the volume distribution curve of the particle size. In addition, the meaning of the peak of less than 10 $\mu$m is that the maximum value of the particle size distribution is in the range of less than 10 $\mu$m. When there are multiple peaks, the meaning of the peak of less than 10 $\mu$m is that the biggest maximum value of them is in the range of less than 10 $\mu$m. It is more preferably that the fine metal oxide powder of this invention has the peak of the particle size distribution in the particle size range of 0.1–10 $\mu$m, wherein the agglomerated particles, which are more than 55% of a whole volume, are included.

Regarding the toner for the electronic photograph, although the toner having the average particle, size of about 10 $\mu$m has been used in general, it is in the tendency that, more fine toner having the average particle size of about 5 $\mu$m is used for high image quality. Therefore, in the present invention, the particle size of the agglomerated particle of the metal oxide fine powder is made to have the peak of the particle size distribution at less than 10 $\mu$m, preferably less than 5 $\mu$m, to be fine as the same size or less than the size of the toner. By this way, the agglomerated particle of the metal oxide fine powder can exist between the toner particles, so that the caking between the toner particles is prevented to increase the flowability of the toner composite. When the distribution peak of these agglomerated particles is in the range of more than 10 $\mu$m, the metal oxide particle cannot exist between the toner particles, which have smaller size than this value, so that the flowability of the toner composite cannot be improved. In addition, since the metal oxide fine powder exists in the agglomerated state in general, when the powder, in which the primary particle size is smaller than the toner particle, is used, the sufficient effect for the flowability improve can not be acquired without controlling the particle size of the agglomerated particle. Moreover, when the average particle size of the primary particle is more than 300 nm, or the specific surface area of the primary particle is smaller than 10 $m^2/g$ by the BET method, it is not preferably since the distribution peak of the agglomerated particles is easy to be in the range of more than 10 $\mu$m. On the other hand, when the specific surface area is more than 400 $m^2/g$ by the BET method, it is not preferably since the caking is too strong to become the peak of the particle size distribution more than 10 $\mu$m.

[V] Pulverizing/Pulverizing Process

The metal oxide fine powder hydrophobic treated on the surface is pulverized or pulverizing processed to be prepared to the above-mentioned particle size range. It is available that this pulverizing or pulverizing process is same as the conventional one. In addition, by processing to combine the pulverizing or the pulverizing process and the classification, the metal oxide fine powder having the above-mentioned particle size can be obtained efficiently. As a pulverizing machine, a mechanical pulverizing machines, such as a pin-mill, a fine-mill, a bead-mill, a ball-mill, a hummer-mill, or a chopper, etc., can be used. As the classification process, an air classification, a sieving, or a jet sieving, etc., can be used. In addition, the actual conditions for controlling to the above-mentioned particle size range are determined according to the kinds of the metal oxide materials, the conditions of the surface modification, the pulverizing equipments, or the classification equipments. Regarding the surface treated metal oxide powder, the agglomerated particles of said powder become to the agglomerates, in which said particles combine more like a net, and, furthermore, these agglomerate combine to exist as the clusters. These agglomerates or clusters are pulverized to the level of the agglomerated particle or the primary particle by the pulverizing process.

[VI] Bulk Density

Regarding the metal oxide fine powder of the present invention, it is preferably that the bulk density is more than 30 g/L, more preferably more than 100 g/L. When the bulk density is less than 30 g/L, there are problems in dust, and handling of transportation, etc. When the bulk density is more than 100 g/L, the handling is good, and the dispersibility is improved remarkably at the time of adding to the powder. Furthermore, it is easy to control the distribution peak of the particle size.

[VII] Toner Composite

The toner composite for the electronic photograph etc. of the present invention contains the above-mentioned metal oxide fine powder having the high dispersibility. By containing the metal oxide fine powder having the high dispersibility, where the particle size of the agglomerated particle is controlled as above-mentioned particle size, said metal oxide fine powder is dispersed uniformly between the toner particles, so that it is obtained that the toner composite has the high electrostatic charge stability and the excellent flowability. Although the content of the above-mentioned metal oxide fine powder in the toner composite is based on the kinds of the metal oxide and the hydrophobicity of the powder etc., it is preferably that the content is 0.01–5.0% by weight in general. When the content is less than 0.01% by weight, the effect of addition is not acquired sufficiently. On the other hand, when the addition is more than 5.0% by weight, there is no wide difference of the flowability or the electrostatic charge stability, and there may be a problem in the image quality or the cleaning.

It is available that the composition of the toner composite of the present invention is same as the conventional composition excepting the above-mentioned metal oxide fine powder. For example, as the toner, the common used toner can be used, which is made by blending coatings, and additives, with the binder resin, i.e. the thermoplastic resin. As the additives, magnetic materials, or electrostatic charge control reagents are used if necessary. Moreover, it is available that said toner is used magnetic type or non-magnetic type, negative or positive charge, and monochrome or color. In addition, it is also available that said toner can be used as the mono component system not using a career, or the two components system using a career. In addition, in the toner composite of the present invention for the electronic photograph etc., the above-mentioned metal oxide fine powder used as the external additive can be not only used individually, but also used together with the other metal oxide fine powder. For example, the above-mentioned metal oxide fine powder can be used together with the fine silica powder produced by dry-process, the fine titanium oxide powder produced by dry-process, and the fine titanium oxide powder produced by wet-process, etc., which are surface-modified by other processes.

EXAMPLE AND COMPARISON EXAMPLE

The invention will be explained more concretely with following examples. In addition, in the following examples, the particle size distribution, the hydrophobicity, the flowability, the electrostatic charge and its stability, and the image qualities, were measured and evaluated as follows.

(A) Particle Size Distribution

The particle size distribution with the volume standard was measured by the particle size distribution measuring equipment by laser diffraction/dispersion method (LA-910 made by Horiba Co. LTD).

(B) Hydrophobicity 1 g of sample was weighed and taken into the 200 ml of separatory funnel, and 100 ml of pure water was added to said funnel. And after mixing for 10 minutes by the tumbler mixer, the mixed substance was put quietly for 10 minutes. After that, 20–30 ml of the solution was drawn out from the under layer, and 10 ml of said solution was taken out to a quartz cell. The solution was measured by a spectrophotometer using pure water as a blank. The transparency of 500 nm wavelength of light was defined as the hydrophobicity.

(C) Flowability 0.4 g of the metal oxide fine powder and 40 g of the toner particle (the average particle diameter of 7 $\mu$m), were stirred and mixed by the mixer to prepare the toner composite for the electronic photograph. In addition, the mixed substance was screened out in order through the three sorts of screens, i.e., 150 $\mu$m, 75 $\mu$m and 45 $\mu$m, by vibrating, in use of a powder tester (PT-N type made by HOSOKAWA MICRON Co. LTD), and the ratio of the powder passing all screens was defined as the ratio of 45 $\mu$m screen passage. In these values, more than 80% of this value was defined as good flowability.

(D) Electrostatic Charge 50 g of an iron powder career and 0.1 g of the high dispersible hydrophobic metal oxide fine powder were put into a glass container having 75 ml of volume, and after mixing these powders for 5 minutes by a tumbler mixer, 0.1 g of the mixed powder of this metal oxide fine powder and the iron powder were extracted. Then, the measured value after blowing with nitrogen gas for 1 minute by using the measuring equipment of blow-off electrostatic charge (TB-200 type made by Toshiba Chemical CORP), was defined as the electrostatic charge.

(E) Electrostatic Charge Stability 0.4 g of the metal oxide fine powder and 40 g of the toner particle having 7 $\mu$m diameter were put into the glass container having 75 ml of volume and mixed by stirring with the mixer to prepare the toner composite for the electronic photograph. The mixed powder, in which 48 g of the iron powder career was added to 2 g of this toner composite, was kept for 24 hours under the conditions of high temperature and high humidity (hereinafter said to as HH condition), and low temperature and low humidity (hereinafter said to as LL condition). In addition, HH condition is temperature of 40° C. and humidity of 85%, and LL condition is temperature of 10° C. and humidity of 20%. After these treatments, this mixed powder was mixed for 5 minutes by the tumbler mixer and 0.2 g of the mixed powder was extracted to measure the electrostatic charge. The electrostatic charge was measured after blowing nitrogen gas for 1 minute by using the measuring equipment of blow-off electrostatic charge (TB-200 type made by Toshiba Chemical CORP), and the difference between the electrostatic charge of the powders under HH condition and LL condition, was obtained. When this difference is less than 5 $\mu$C/g, the powder was defined to be stable to the ambient variation.

(F) Image Quality

When more than 50,000 sheets were printed by using a commercial copying machine, the picture fogs and the distribution of image density were checked.

Example 1

100 weight parts of fumed-silica (made by NIPPON AEROSIL Co., LTD. and the specific surface area of 400 m$^2$/g and the average diameter of the primary particle of about 7 nm) was put into the mixer, and while stirring under nitrogen atmosphere, 35 weight parts of the organopolysiloxane and 65 weight parts of the normal-hexane were dropped on the mixed powder to heat at 250° C. for 1 hour. After removing the solvent, the mixed substance was pulverized and classified to be cooled. The particle size distribution of the obtained fine powder by the laser diffraction, had the peak at 0.25 $\mu$m and 70% of the agglomerated particles in the whole volume were contained in the range of 0.1–10 $\mu$m In addition, in said obtained fine powder, the hydrophobicity was 96% by the transparency method, the specific surface area was 150 m$^2$/g by the BET method, pH was 5.7, and the bulk density was 30 g/l. This fine powder was mixed to the negative charge toner, which has 7 $\mu$m of average particle diameter, to prepare the toner composite. When this flowability was measured, the ratio of 45 $\mu$m screen passage was 85%, the angle of rest was 32 degrees, so that good flowability was obtained. Moreover, the difference of the electrostatic charge was 2 $\mu$C/g by the electrostatic charge stability measurement, and this value was good electrostatic charge stability. In addition, when more than 50,000 sheets were copied using said toner composite by the commercial copying machine, the picture fogs and the difference of the image density did not appear and was good image quality.

Comparison Example 1

The hydrophobic silica fine powder was made by the same process as Example 1 excepting pulverizing and classifying by the fine-mill. The particle size distribution of the obtained fine powder had the peak at 30 $\mu$m by the laser diffraction, and the hydrophobicity was 90% by the transparency method, the specific surface area was 150 m$^2$/g, pH was 5.5, and the bulk density was 61 g/l. This fine powder was mixed to the toner of the negative charge having 7 μm of the average particle size to prepare the toner composite. When the flowability was measured, the ratio of 45 μm screen passage was 70%, and the angle of rest was 40 degrees. In addition, the difference of the electrostatic charge was 10 μC/g by the electrostatic charge stability measurement, and the charge variation was large. Furthermore, when 2,000 sheets were copied by the commercial copying machine, the white spots appeared and there was a problem in the image quality.

Example 2

100 weight parts of an ultra-fine titania powder (made by NIPPONN AEROSIL CO., LTD. titanium oxide TN20, in which the specific surface area of 20 m²/g) was put into the mixer, and while stirring under nitrogen atmosphere, 4 weight parts of octyltrimethoxysilane (made by SINETSU KAGAKU CO., LTD, KBM3083), and 16 weight parts of methanol were dropped on the mixed powder. After heating and stirring at 150° C. for 1 hour, the solvent was removed and the mixed substance was pulverized and classified by using the pin-mill and an air classification machine to be cooled. The particle size distribution of the obtained fine powder had the distribution peak of the agglomerated particle at 3.5 μm by the laser diffraction. In addition, in said obtained fine powder, the hydrophobicity was 92.2% by the transparency method, the specific surface area was 13 m²/g, pH was 4.3, and bulk density was 45 g/l. This fine powder was mixed to the negative charge toner having 7 μm of the average particle size to prepare the toner composite. When this flowability was measured, the ratio of the 45 μm screen passage was 80%, and the angle of rest was 40 degrees, so that the good flowability was obtained. Moreover, the difference of the electrostatic charge was 4 μC/g by the electrostatic charge stability measurement, and it was good electrostatic charge stability. Furthermore, when more than 50,000 sheets were copied using the above-mentioned toner composite by the commercial copying machine, the image quality was good.

Comparison Example 2

The hydrophobic titania fine powder was made by the same process as Example 2 excepting pulverizing and classifying. The particle size distribution of the obtained fine powder had the peak at 50 μm. In addition, in said obtained powder, the hydrophobicity was 70% by the transparency method, the specific surface area was 12 m²/g by the BET method, pH was 4.4, and the bulk density was 85 g/l. This fine powder was mixed to the negative charge toner having 7 μm of the average particle size to prepare the toner composite. When this flowability was measured, the ratio of the 45 μm screen passage was 50%, and the angle of rest was 47 degrees. Moreover, the difference of the electrostatic charge was 8 μC/g by the electrostatic charge stability measurement, so that electrostatic charge variation was large. Furthermore, when 1,000 sheets were copied by the commercial copying machine, the fogs appeared and there was a problem in the image quality.

Example 3

100 weight parts of an ultra-fine of alumina powder (made by DEGUSAHYUELUS Company, A1203-C having the specific surface area of 100 m2/g) was put into the mixer, and while stirring under nitrogen atmosphere, 20 weight parts of the organopolysiloxane and 40 weight parts of the normal-hexane were dropped on said mixed powder. And after stirring for 1 hour at 250° C., and removing the solvent, said stirred substance was pulverizing by the ball-mill to be classified by the jet sheave, and was cooled. The particle size distribution of the obtained fine powder had the distribution peak of the agglomerated particle at 3.0 μm by the laser diffraction. In addition, in said obtained powder, the hydrophobicity was 63% by the transparency method, the specific surface area was 62 m²/g by the BET method, pH was 5.4, and the bulk density was 130 g/l. This fine powder was mixed to the negative charge toner having 7 μm of the average particle diameter to prepare the toner composite. When the flowability was measured, the ratio of 45 μm screen passage was 88%, and the angle of rest was 38 degrees, so that it was good flowability. Moreover, the difference of the electrostatic charge was 3 μC/g by the electrostatic charge stability measurement, and it was good electrostatic charge stability. Furthermore, when more than 5000 sheets were copied using the above-mentioned toner composite by the commercial copying machine, the image quality was good.

Comparison Example 3

The hydrophobic alumina fine powder was made by the same process as Example 3 excepting pulverizing and classifying. The particle size distribution of said fine powder had the distribution peak of the agglomerated particle at 25.0 μm by the laser diffraction. In addition, in said obtained powder, the hydrophobicity was 40% by the transparency method, the specific surface area was 58 m²/g by the BET method, pH was 5.5, and the bulk density was 60 g/l. This fine powder was mixed to the negative charge toner having 7 μm of the average particle size to prepare the toner composite. When the flowability was measured, the ratio of 45 μm screen passage was 68%, and the angle of rest was 48 degrees. Moreover, the difference of the electrostatic charge was 8 μC/g by the electrostatic charge stability measurement, and the electrostatic charge variation was large. Furthermore, when 3000 sheets were copied using the above-mentioned toner composite by the commercial copying machine, the fogs appeared, and there was a problem in the image quality.

Example 4

100 weight parts of a hydrophobic fumed-silica (made by NIPPON AEROSIL CO., LTD, Aerosil R 972, the specific surface area is 120 m²/g) was put into the mixer, and while stirring by using a chopper pulverizing under nitrogen atmosphere, 13 weight parts of amino-modified silicone oil (made by SINETSU KAGAGU CO., LTD, KF393), and 40 weight parts of the normal-hexane were dropped on said mixer. After heating and stirring at 200° C. for 1 hour, and removing the solvent, said stirred substance was classified by the air current classification machine to be cooled. The particle size distribution of the obtained fine powder had the peak at 9.0 μm by the laser diffraction. In addition, in said obtained powder, the hydrophobicity was 82% by the transparency method, the specific surface area was 70 m²/g by the BET method, pH was 8.3, and the bulk density was 33 g/l. This fine powder is mixed to the positive charge toner having 7 μm of the average particle size to prepare the toner composite. In addition, when the flowability was measured, the ratio of 45 μm screen passage was 88%, and the angle of rest was 32 degrees, and it was good flowability. Moreover, the difference of the electrostatic charge was 5 μC/g by the electrostatic charge stability measurement, and it was good electrostatic charge stability. Furthermore, when more than 50000 sheets were copied using the above-mentioned toner composite by the commercial copying machine, the image quality was good.

Comparison Example 4

The hydrophobic silica fine powder was made by the same process as Example 4 excepting pulverizing and classifying. The particle size distribution of the obtained fine powder had the peak at 47 μm, where the hydrophobicity was 80% by the transparency method, the specific surface area was 65 m²/g, pH was 8.2, and the bulk density was 54 g/l. This powder was mixed to the positive charge toner having 7 μm of the average particle diameter to prepare the toner composite. In addition, when the flowability was measured, the ratio of the 45 μm screen passage was 65%, and the angle of rest was 39 degrees. Moreover, the difference of the electrostatic charge was 12 μC/g by the electrostatic charge stability measurement, and the electrostatic charge variation was large. Furthermore, when 1000 sheets were copied using the above-mentioned toner composite by the commercial copying machine, the picture concentration became thin, and there was a problem in the image quality.

The above results are shown in Table 1 and Table 2. As shown in this results, in the case of the fine powder, which was pulverized and classified at least more than one time, simultaneously, before or after, with the surface modification, and has the controlled maximum peak of the agglomerated particle size (volume standard) of less than 10 um, preferably less than 5 um, the flowability of the toner composite and the electrostatic charge stability are improved remarkably. In addition, said powder has good picture reproducible characteristics.

TABLE 1

Characteristics of metal oxide fine powders and the toner composite using them

|  | Example 1 | Example 2 | Example 3 | Example 4 |
|---|---|---|---|---|
| Kinds of oxide | Silica | Titania | Alumina | Silica |
| Pulverizing method | Fine mill | Pin-mill | Ball-mill | Chopper |
| Classification method | Air classification | Air Jet-sieve | | Air classification |
| Peak (μm) | 0.25 (0.1~10) | 3.5 | 3.0 | 9.0 |
| Hydrophobicity (%) | 96 | 92.2 | 63 | 82 |
| Specific surface area by the BET method (m²/g) | 150 | 13 | 62 | 70 |
| pH | 5.7 | 4.3 | 5.4 | 8.3 |
| Bulk density (g/l) | 30 | 45 | 130 | 33 |
| Flowability | ○ | ○ | ○ | ○ |
| Electrostatic charge | ○ | ○ | ○ | ○ |
| Image quality | ○ | ○ | ○ | ○ |

Peak is the distribution peak of the agglomerated particles.
○ in Flowability is that the ratio of the 45 μm screen passage is more than 80%.
○ in Electrostatic charge is that the difference of the electrostatic charge is less than 5 μC/g by the electrostatic charge stability measurement.
○ in image quality is that there are no fogs at the time of more than 5000 sheets copying.

TABLE 2

Characteristics of metal oxide fine powders and the toner composite using them

|  | Comparison Example 1 | Comparison Example 2 | Comparison Example 3 | Comparison Example 4 |
|---|---|---|---|---|
| Oxide | Silica | Titania | Alumina | Silica |
| Pulverizing and Classification | No pulverizing and classification | No pulverizing and classification | No pulverizing and classification | No pulverizing and classification |
| Peak (μm) | 30 | 50 | 25 | 47 |
| Hydrophobicity (%) | 90 | 70 | 40 | 80 |
| Specific surface area by the BET method (m²/g) | 150 | 12 | 58 | 65 |
| pH | 5.5 | 4.4 | 5.5 | 8.2 |
| Bulk density (g/l) | 61 | 85 | 60 | 54 |
| Flowability | Δ | X | Δ | Δ |
| Electrostatic charge | X | X | X | X |
| Image quality | X | X | X | X |

Peak is the distribution peak of the agglomerated particles.
Δ in Flowability is that the ratio of the 45 μm screen passage is 80% to 60%, and X is less than 60%.
○ in Electrostatic charge is that the difference of the electrostatic charge is less than 5 μC/g by the electrostatic charge stability measurement, and X is over 5 μC/g.
○ in image quality is that there are no fogs at the time of more than 5000 sheets copying, and X is there are some fogs.

Effectiveness of the Invention

The hydrophobic metal oxide fine powder having high dispersibility of the present invention can be dispersed in the toner easily, and improve the electrostatic charge and the flowability of the toner with balance sufficiently. That is, the stable electrostatic charge, which is not influenced by the environmental conditions, such as humidity or temperature, and also with time, is realized, and the flowability is improved, by adding the hydrophobic metal oxide fine powder having high dispersiibility of the present invention to the toner. For this reason, by using said powder for the developer of the electronic photograph etc., when the copies having large number are repeated, the good image quality reproducibility is maintained.

What is claimed is:

1. A metal oxide fine powder having high dispersibility in a powder material, which has a hydrophobic-treated surface and is used as an additive of the powder material,
    wherein a primary particle of said powder having an average size of less than 300 nm and a specific surface area of 10–400 m²/g by BET method is hydrophobic treated to have hydrophobicity of more than 30%, and
    wherein said hydrophobic-treated powder is pulverized or pulverizing processed to have a peak of a particle size distribution containing more than 55% of agglomerated particles and being in a range of 0.1 to 10 μm.

2. The metal oxide fine powder according to claim 1, wherein the peak of the particle size distribution of the agglomerated particles is less than a same level of the average particle size of the powder material.

3. The metal oxide fine powder according to claim 1, wherein the peak of the particle size distribution of the agglomerated particles is in a range of less than 5 μm.

4. The metal oxide fine powder according to claim 1, wherein the bulk density is more than 30 g/L.

5. The metal oxide fine powder according to claim 4, wherein the bulk density is more than 100 g/L.

6. The metal oxide fine powder according to claim 1, wherein the metal oxide fine powder is selected from the group consisting of: silica, titania, alumina, zirconia, and a composite oxide of these oxides, which has a hydrophobic treated surface with an organic silicon compound.

7. The metal oxide fine powder according to claim 1, wherein the powder material is a toner for a powder coating or an electronic photograph.

8. A toner composite, wherein flowability is raised by adding the metal oxide fine powder according to claim 1.

9. The toner composite according to claim 8, wherein a content of the metal oxide fine powder is 0.01 to 5.0% by weight.

10. A metal oxide fine powder having high dispersibility in a powder material, comprising a plurality of metal oxide particles having hydrophobic-treated surfaces and including a plurality of primary metal oxide particles, wherein the primary metal oxide particles have an average size of less than 300 nm, a specific surface area of 10–400 $m^2$/g by BET method, and hydrophobicity of more than 30%, and said metal oxide particles are pulverized or pulverizing processed to have a peak of a particle size distribution containing more than 55% of agglomerated particles and being in a range of 0.1 to 10 $\mu$m.

11. The metal oxide fine powder according to claim 10, wherein the peak of the particle size distribution of the agglomerated particles is less than a same level of the average particle size of the powder material.

12. The metal oxide fine powder according to claim 10, wherein the peak of the particle size distribution of the agglomerated particles is in a range of less than 5 $\mu$m.

13. The metal oxide fine powder according to claim 10, wherein the bulk density is more than 30 g/L.

14. The metal oxide fine powder according to claim 13, wherein the bulk density is more than 100 g/L.

15. The metal oxide fine powder according to claim 10, wherein the metal oxide particles comprise a metal oxide selected from the group consisting of silica, titania, alumina, zirconia, and a composite oxide thereof, and the metal oxide particles have hydrophobic treated surfaces including an organic silicon compound.

16. The metal oxide fine powder according to claim 10, wherein the powder material is a toner for a powder coating or an electronic photograph.

17. A toner composite comprising a metal oxide fine powder including a plurality of metal oxide particles having hydrophobic-treated surfaces and including a plurality of primary metal oxide particles, wherein the primary metal oxide particles have an average size of less than 300 nm, a specific surface area of 10–400 $m^2$/g by BET method, and hydrophobicity of more than 30%, and said metal oxide particles are pulverized or pulverizing processed to have a peak of a particle size distribution containing more than 55% of agglomerated particles and being in a range of 0.1 to 10 $\mu$m.

18. The toner composite according to claim 17, wherein a content of the metal oxide fine powder is 0.01 to 5.0% by weight.

* * * * *